Patented June 8, 1954

2,680,717

UNITED STATES PATENT OFFICE 2,680,717

SALTS OF POLYMERIC AMINES WITH PERFLUOROCARBOXYLIC ACIDS

Ernest Lewis Little, Jr., Wilmington, Del., assignor to E. I. du Pont de Nemours and Company, Wilmington, Del., a corporation of Delaware No Drawing. Application February 12, 1953,
Serial No. 336,635

8 Claims. (Cl. 252—33.6)

This invention relates to oil-soluble polymeric materials and, more particularly, to such materials which are beneficial in promoting the scavenging of deposits in internal combustion engines, and to oil compositions containing such polymeric materials.

A major problem in the operation of both spark ignition and diesel engines results from the formation of deposits which adhere to the combustion chamber of the engine. These deposits, which appear as carbon, resins, or insoluble varnish-like gums, may arise from the fuel additives such as tetraethyl lead, from incomplete combustion of the fuel, from oxidation of the lubricating oil, or from a combination of these causes. The presence of such deposits increases the octane requirement of the engine and also increases preignition, power loss, and spark plug fouling.

An object of the present invention is to provide new oil-soluble polymeric materials. A further object is to provide such materials which are of particular value in reducing or preventing the adhesion of deposits in the combustion chamber of internal combustion engines. A still further object is to provide new hydrocarbon oil compositions. Other objects will be apparent from the description of the invention given hereinafter.

The above objects are accomplished according to the present invention by providing a salt of a hydrocarbon oil-soluble polymeric amine containing at least 0.1%, by weight, of amino nitrogen and having a carbon to amino nitrogen ratio of at least 7 to 1, with a perfluorocarboxylic acid of the formula $X(CF_2)_n COOH$ wherein X is hydrogen or fluorine and $n$ is an integer from 3 to 20, inclusive. The invention further comprises, as a new composition, a hydrocarbon oil containing 0.1% to 20%, by weight thereof, of a salt as defined above.

The polymeric salts defined above are soluble, to the extent of at least 0.2% by weight, in hydrocarbon oils such as gasoline, kerosene, diesel oil, furnace oil, lubricating oils, and the like, and in the synthetic lubricating oils of the ester and polyglycol type. They are made simply by reacting the polymeric amine with the perfluorocarboxylic acid at ordinary or elevated temperature, generally in the range of 0° C. to 200° C., and preferably directly in the oil in which the polymeric salt is to be dissolved.

The perfluorocarboxylic acids suitable for the preparation of the salts of this invention have recently been described in the chemical literature, for example, in Industrial and Engineering Chemistry 39, 415 (1947), and in U. S. Patents 2,559,629; 2,559,752 and 2,567,011. Numerous polymeric amines (i. e., polymers containing a multiplicity of primary, secondary or tertiary amino groups) have been described in the literature. Among such amino polymers, those that are soluble in hydrocarbon oils to the extent of at least 0.2%, are suitable as starting materials. Oil-solubility is generally possessed by amino polymers having a sufficiently high ratio of carbon atoms to amino nitrogen atoms, and a relatively low amino nitrogen content. It has been found that amino polymers containing at least 0.1%, by weight, of amino nitrogen and having a carbon to amino nitrogen ratio of at least 7 to 1, are suitable for the preparation of oil-soluble fluorocarboxylic acid salts. For best results, these amino polymers should have a molecular weight such that their inherent viscosity, as determined at 0.1% weight per volume concentration in benzene at 25° C., is in the range of 0.1 to 3.0, and preferably in the range of 0.2 to 1.0.

It is not essential that all of the amino groups in the amino polymer be neutralized by fluorocarboxylic acid groups. In fact, better results are often obtained when the final product contains some free amino groups. However, it is in general desirable that at least 20% of the amino groups be neutralized by the fluorocarboxylic acid.

The invention is illustrated in greater detail in the following examples in which all proportions are by weight unless otherwise stated.

Example I

A solution of 5 g. of an 80/20 copolymer of lauryl methacrylate and beta-diethylaminoethyl methacrylate in 495 g. of a Pennsylvania oil of SAE-30 viscosity was treated with 1 g. of 5 H-octafluoropentanoic acid,

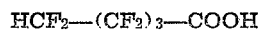

$HCF_2—(CF_2)_3—COOH$

This amount was less than the amount (1.33 g.) required to react with all the basic amino groups present in the polymer. A gelatinous precipitate slowly formed, indicating reaction between the acid and the amino groups present in the copolymer. The reaction mixture was stirred at 120–130° C. for three hours. The precipitate dissolved and remained in solution on cooling.

The technical lauryl methacrylate used in the preparation of the basic copolymer of this example was the methacrylic acid ester of technical lauryl alcohol, which is obtained by reduction of the fatty acids of coconut oil and is a mixture of saturated straight chain alcohols ranging from about 10 to 18 carbon atoms. A typical sample will contain approximately 3% $C_{10}$, 61% $C_{12}$, 23% $C_{14}$, 11% $C_{16}$, and 2% $C_{18}$ alcohols.

Example II

Five grams of the basic copolymer of Example I was dissolved in 495 g. of a Pennsylvania oil of SAE-30 viscosity and 1½ g. of 11 H-eicosafluoroundecanoic acid, $HCF_2-(CF_2)_9-COOH$, was added to the oil solution. A gelatinous precipitate formed which dissolved on warming to 130° C. and stirring for two hours. On cooling, the polymeric salt remained in solution. The amount of fluorocarboxylic acid used was about one-third that required to react with all the amino groups of the copolymer.

Example III

Fifteen grams of the basic copolymer of Example I was dissolved in 495 g. of a commercial octane mixture. The solution was heated to 70° C. and 3 g. of 5 H-octafluoropentanoic acid was added. This was three-fourths of the amount required to neutralize the amino groups. A precipitate formed but quickly dissolved on warming to 90° C. A clear solution was obtained on cooling.

Example IV

Fifteen grams of the basic copolymer of Example I was dissolved in 495 g. of a commercial octane mixture. The solution was heated to 70° C. and 4½ g. (one-half the calculated amount) of 11 H-eicosafluoroundecanoic acid was added. A clear solution was obtained on cooling.

Example V

Fifteen grams of the basic copolymer of Example I was dissolved in 495 g. of n-hexane. The solution was heated to 50° C. and 3 g. of 5 H-octafluoropentanoic acid was added. The solvent was then removed by distillation and 18 g. of the polymeric salt was obtained as a sticky solid. Solutions containing 2% by weight of this polymeric salt were made in the following lubricating oils: Pennsylvania SAE-30 oil, naphthenic light base oil, Pennsylvania SAE-10 light base oil and naphthenic heavy medium base oil.

Example VI

Fifteen grams of the basic copolymer of Example I was dissolved in 495 g. of a commercial octane mixture. The solution was warmed to 70° C. and 5 g. of 11 H-eicosafluoroundecanoic acid was added. The solvent was then removed by distillation, and 20 g. of the polymeric salt was obtained as a sticky solid. Solutions containing 2% by weight of this polymeric salt were made in the following lubricating oils: Naphthenic light base oil, Pennsylvania SAE-10 light base oil, naphthenic heavy medium base oil, Pennsylvania SAE-30 base oil, and furfural-extracted Mid-Continent oil.

Example VII

The effect of these fluorocarboxylic acid salts of polymeric amines on improving the characteristics of carbonized lubricating oils was tested by placing 1 g. samples of each of the 2% oil solutions of Examples V and VI in aluminum dishes and heating them in a muffle furnace at 700° F. (370° C.) for four hours.

The adhesion of the resulting carbonized lubricating oils to the aluminum surfaces was then tested by scraping and also by shaking silicon carbide in the dishes. There was a marked difference between the adhesion of residues from untreated oil and those from oils containing the fluorocarboxylic acid salts. The residues from the oils containing these salts adhered much less strongly than those from the untreated oils to the aluminum surface.

Example VIII

A standard Lauson single-cylinder engine was operated under steady medium duty conditions using an unleaded catalytic cracked gasoline (containing 0.05 per cent organic sulfur) and a Mid-Continent furfural-extracted lubricating oil of SAE-20 viscosity containing 1.0 per cent of a polymeric amine salt of fluorocarboxylic acid as an oil additive. The amine salt used was 75% of the basic copolymer of Example I and 25% 11 H-eicosafluoroundecanoic acid $HCF_2-(CF_2)_9-COOH$

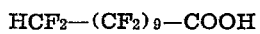

At the completion of 105 hours of engine operation the octane requirement increase of the engine, due to combustion chamber deposits was 13 octane units, based on an octane requirement of 57 units with a clean combustion chamber and a requirement of 70 units at the end of the test. The weight of deposits in the combustion chamber was 0.37 gram. In a similar engine test without the oil additive the octane requirement increase was 16 units, with a deposit weight of 0.58 gram.

It will be understood that the above examples are merely illustrative and that the present invention broadly comprises a salt of a hydrocarbon oil-soluble polymeric amine containing at least 0.1%, by weight, of amino nitrogen and having a carbon to amino nitrogen ratio of at least 7 to 1, with a perfluorocarboxylic acid of the formula $X(CF_2)_nCOOH$ wherein X is hydrogen or fluorine, and $n$ is an integer from 3 to 20, inclusive, and, as a new composition, a hydrocarbon oil containing 0.1% to 20%, by weight of the oil, of a salt as defined above.

The polymeric salts of this invention can be prepared using any perfluorocarboxylic acid of the general formula $X(CF_2)_nCOOH$, where X is hydrogen or fluorine and $n$ is an integer from 3 to 20, inclusive. Examples of suitable perfluorocarboxylic acids include heptafluorobutyric acid, nonafluoropentanoic acid, undecafluorohexanoic acid, 7 H-dodecafluoroheptanoic acid, pentadecafluorooctanoic acid, 9 H-hexadecafluorononanoic acid, nonadecafluorodecanoic acid, 13 H-tetracosafluorotridecanoic acid, 17 H-dotriacontafluoroheptadecanoic acid, and 21 H-tetracontafluoroheneicosanoic acid. The nomenclature used here is that recommended for highly fluorinated compounds by the Committee on Nomenclature of the American Chemical Society, Chem. and Eng. News 30, 4515 (1952), whereby any carbon atom bearing one hydrogen but otherwise fully fluorinated is designated by a position symbol, followed by the italic capital H. The most accessible and, therefor, preferred perfluorocarboxylic acids are those of the formula $H(CF_2)_nCOOH$, wherein $n$ is an even integer from 4 to 16, inclusive. Mixtures of two or more perfluorocarboxylic acids can be used.

The polymeric amine which is the other component of the salts of this invention can be any linear addition or condensation polymer containing a plurality of primary, secondary or tertiary amino groups, which is soluble in hydrocarbon oils, has an inherent viscosity of at least 0.1 in 0.1% concentration in benzene at 25° C., contains at least 0.1% by weight of amino nitrogen, and has a carbon to amino nitrogen ratio of at least 7 to 1, the latter corresponding to a maximum amino nitrogen percentage of about 13.5%.

Among the suitable polymeric amines may be mentioned the hydrogenated 1,3-butadiene/acrylonitrile and 1,3-butadiene methacrylonitrile copolymers; the polyamines obtained by reductive amination of ethylene/carbon monoxide copolymers (U. S. Patent 2,495,255); poly-N-dodecylethylenimine; the polyvinylpyridines and polyvinylquinolines, with or without alkyl substituents on the nucleus; the polymerized acrylates and methacrylates of N-beta-hydroxyethyl tertiary amines, such as beta-dimethylaminoethyl acrylate, beta-di-n-butylaminoethyl methacrylate, triethanolamine monomethacrylate, beta-dicyclohexylaminoethyl methacrylate, 1-(beta-methacryloxyethyl)piperidine, 4-(beta-methacrylyloxyethyl)morpholine; the linear polyamides containing intralinear tertiary amino groups (U. S. Patent 2,774,831); the aminated products obtained by catalytically hydrogenating resins having ketone groups in the presence of ammonia or amines (U. S. Patent 2,063,158); the reaction products of vinyl ketone polymers with ammonia or primary amines (U. S. 2,122,707); the linear polyamines resulting from the condensation of diamines with evolution of ammonia; the polymeric amines obtained by reacting polymers containing epoxy groups with ammonia, primary or secondary amines (as more fully disclosed in U. S. application Serial No. 295,127, filed in the name of M. E. Cupery on June 23, 1952); polyaminostyrene; and the like.

The best results as regards oil-solubility are obtained when the polymeric amine contains from about 0.2% to about 5% by weight of amino nitrogen and has a carbon to amino nitrogen ratio of at least 20 to 1. Polyamines in this preferred class are most conveniently obtained by addition copolymerization of two vinylidene monomers, one of which contains no basic nitrogen but contains at least eight carbon atoms and provides an oleophilic structure, and the other of which contains one or more amino nitrogens. These monomers can readily be polymerized in such a ratio of one component to the other that the final copolymer has the desired amino nitrogen content and carbon to amino nitrogen ratio. As the oleophilic components of these preferred copolymers there can be employed polymerizable esters, amides, and hydrocarbons characterized by the presence of at least eight carbon atoms, preferably with six or more in a straight chain, with one terminal carbon to carbon double bond. Examples of such compounds are the saturated and unsaturated long chain esters of unsaturated carboxylic acids, such as decyl acrylate, 3,5,5-trimethylhexyl acrylate, 9-octadecenyl methacrylate; vinyl esters of long chain carboxylic acids, such as vinyl laurate, vinyl stearate; N-long chain hydrocarbon substituted amides of unsaturated acids such as N-octadecyl acrylamide; long chain unsaturated monoolefins such as the alkylstyrenes, e. g., dodecylstyrene; and the like. An especially useful olephilic component is technical lauryl methacrylate. As the amino nitrogen component there can be employed amino-substituted olefins such as p-(beta-diethylaminoethyl)styrene; polymerizable amino nitrogen-containing heterocycles, e. g., vinylpyridine and the vinyl alkylpyridines such as 2-vinyl-5-ethylpyridine; vinyl ethers of amino alcohols, such as beta-diethylaminoethyl vinyl ether; amides of unsaturated carboxylic acids having amino substituents on the amido nitrogen, such as N-(beta-dimethylaminoethyl)-acrylamide; polymerizable unsaturated amines, such as diallylamine; and especially and most usefully, the already mentioned acrylic and methacrylic acid esters of N-beta-hydroxyethyl tertiary amines.

As already noted, the products of this invention have a special usefulness as additives to hydrocarbon oils such as gasolines, fuel oils and lubricating oils, wherein they act as scavenging agents for the deposits which form in internal combustion engines. For this purpose they are generally used at concentrations which may vary from 0.1% to 20% by weight of the hydrocarbon solvent. The scavenging action of these agents is noticeable on any metal surface, including aluminum, iron, steel, copper, brass, Monel metal, alloys, etc. They are also effective as dispersing agents in systems employing hydrocarbon solvents. They are further useful in making metal surfaces organophobic and hydrophobic, for example, by spraying or coating thereon.

As many apparently widely different embodiments of this invention may be made without departing from the spirit and scope thereof, it is to be understood that the invention is not limited to the specific embodiments thereof except as defined in the appended claims.

The invention claimed is:

1. A salt of a hydrocarbon oil-soluble polymeric amine containing at least 0.1% by weight, of amino nitrogen and having a carbon to amino nitrogen ratio of at least 7 to 1 and having an inherent viscosity, determined at 0.1% concentration in benzene at 25° C., of at least 0.1, with a perfluorocarboxylic acid of the formula $X(CF_2)_nCOOH$ wherein X is from the group consisting of hydrogen and fluorine, and $n$ is an integer from 3 to 20, inclusive.

2. A salt as set forth in claim 1 wherein at least 20% of the amino groups of said amine are neutralized by said perfluorocarboxylic acid.

3. A salt as set forth in claim 2 wherein said perfluorocarboxylic acid has the formula $H(CF_2)_nCOOH$ wherein $n$ is an even integer from 4 to 16, inclusive.

4. A salt as set forth in claim 2 wherein said polymeric amine is one having an inherent viscosity, determined at 0.1% concentration in benzene at 25° C., of 0.1 to 3.0.

5. A salt as set forth in claim 4 wherein said polymeric amine is one containing 0.2% to 5%, by weight, of amino nitrogen and having a carbon to amino nitrogen ratio of at least 20 to 1.

6. A salt as set forth in claim 4 wherein said polymeric amine is a copolymer of a monomeric vinylidene compound containing at least eight carbon atoms with at least six in a straight chain and no basic nitrogen, and a monomeric vinylidine compound containing at least one amino nitrogen.

7. A salt as set forth in claim 4 wherein said polymeric amine is an 80/20, by weight, copolymer of lauryl methacrylate and beta-diethylaminoethyl methacrylate.

8. A composition comprising a hydrocarbon oil and 0.1% to 20%, by weight of said oil, of a salt as set forth in claim 1.

References Cited in the file of this patent

UNITED STATES PATENTS

| Number | Name | Date |
|---|---|---|
| 2,317,751 | Frolich | Apr. 27, 1943 |
| 2,342,114 | Blair | Feb. 22, 1944 |
| 2,484,423 | Gleason | Oct. 11, 1949 |